Jan. 10, 1928.

F. S. CARR 1,656,039

SEPARABLE FASTENER

Filed July 22, 1925

Inventor:
Fred S. Carr,
by Emery Booth Janney Varney
Attys.

Patented Jan. 10, 1928.

1,656,039

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

SEPARABLE FASTENER.

Application filed July 22, 1925. Serial No. 45,271.

This invention aims to provide improvements in separable fasteners.

In the drawings, which illustrate a preferred embodiment of my invention:—

Figure 4:
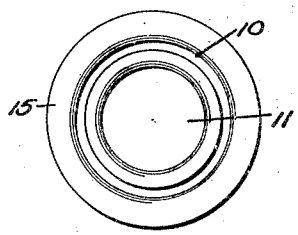
Figure 6:
Figure 5:
Figure 7:
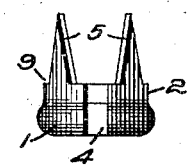
Figure 8:
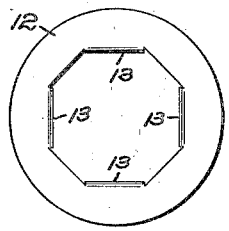
Figure 9:
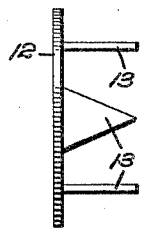

Figs. 4 and 5 include a plan and a side elevation of the stud-receiving body part;

Figs. 6 and 7 include a plan and a side elevation of the socket-engaging body part of the stud; and Figs. 8 and 9 includes a plan and a side elevation of the attaching plate for the socket.

Referring to the drawings, I have shown a snap fastener including a stud and a socket particularly, though not exclusively, adapted to be secured to any flexible material, such as cloth, leather or the like. The fastener is particularly simple and durable and therefore is particularly, though not exclusively, useful on gloves, wearing apparel, automobile curtains and the like.

Figure 2:
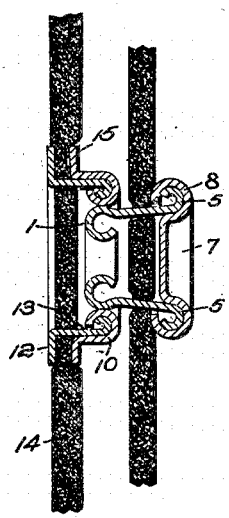
Fig. 2 is a section of the fastener showing the stud contracted during entrance into the socket.

The stud includes a socket-engaging body part pressed from a single piece of metal and presents a ringlike head 1, a neck 2 and a shoulder 3 between the head and neck. A slot 4 is provided at one side of this part to permit contraction thereof when engaging or disengaging a socket as illustrated in Fig. 2. Attaching prongs 5 are formed integral with the socket-engaging part and these pass through a flexible carrying medium 6 and are clenched into engagement with a cap member or attaching part 7 located at the opposite side of the carrying medium.

Figure 3:
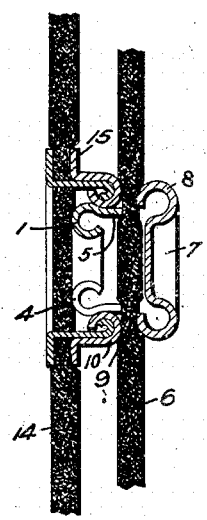
Fig. 3 is a section of the fastener taken on a line between the attaching prongs to show the manner in which the stud parts and the socket parts grip their respective carrying mediums.

The attaching part 7 presents a combined anvil and clinch portion 8 generally curved in cross-section (Figs. 1, 2 and 3) which bends the prongs 5 outwardly and downwardly to grip the carrying medium 6 between the edge 9 of the socket-engaging part, between the prongs, and the clinch portion of the cap 7, as illustrated in Fig. 3. This means of attachment does not interfere with contraction and expansion of the socket-engaging part because the relatively straight portions of the prongs 5, together with the socket-engaging body part, are shiftable in a generally lateral plane. The bend on the prongs 5 occurs at points A adjacent the generally curved portions of the prongs. Thus the curved portions of the prongs are held fixed by the cap member 7 while the remainder of the body part is free to contract and expand as a whole for engagement with a socket.

The socket may be substantially the same as shown and described in my co-pending application Serial No. 45,277, filed of even date herewith. I prefer, however, to provide a socket having a stud-receiving part 10 presenting a stud-receiving aperture 11 of fixed dimensions.

Figure 1:
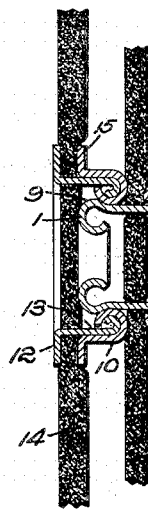
Figure 1 is a section through the fastener showing the stud and socket fully engaged.

The attaching part 12 for the socket is pressed from a single flat piece of metal (Fig. 8), from which are pressed a plurality of prongs 13 for securing the stud-engaging part to the carrying medium 14, as illustrated in Figs. 1 through 3. Thus it will be seen that the prongs are provided on the attaching part 12 rather than on the stud-engaging part as illustrated and described in the above-mentioned application. The prongs are forced through the carrying medium 14 and are received and upset by the ringlike stud-receiving part 10 so that the carrying medium may be gripped between a peripheral flange 15 presented by the part 10 and the attaching part 12.

The above described form of attachment is well adapted for use on gloves because the flat attaching part may rest against the wearer's wrist without being uncomfortable.

During engagement or disengagement of the socket with the stud, the head 1 of the stud engages the wall 14 surrounding the aperture 11 and is contracted as it is forced into the aperture (Fig. 2) until sufficiently small enought to pass the wall 14, which thereafter engages the neck of the stud as illustrated in Fig. 1.

Disengagement is effected by a pull on the carrying medium of either the stud or the socket, thereby tipping one member relative to the other, thereby causing the wall 14 to cam against the shoulder 3 and contract the head 1 of the stud.

While the claims of applicant's co-pending application Serial No. 45,277, filed herewith, read upon certain combinations disclosed by this application, applicant's claims in this application do not overlap with the claims of the above-mentioned application because they are directed to a fastener in which the stud member is resilient and which is provided with attaching means peculiarly adapted to such a stud. The claims in this application could not be supported by the drawings or description of the above-named application and therefore are for separate and distinct combinations.

While I have shown and described a preferred embodiment of my invention, it will be understood that changes involving omission, substitution, alteration and reversal of parts, and even changes in the mode of operation, may be made without departing from the scope of my invention, which is best defined in the following claims.

I claim:

1. A separable fastener comprising, in combination, a socket presenting a stud-receiving aperture, a cooperating resilient stud part contractible and expansible as a whole to permit entrance into the aperture in said socket, and a plurality of attaching prongs integral with said stud part and yieldable therewith and an attaching part at the opposite side of a stud-carrying medium comprising means for securing said resilient stud part to the carrying medium without interfering with the contraction and expansion of said stud part.

2. A separable fastener comprising, in combination, a socket presenting a stud-receiving aperture of fixed dimensions surrounded by a neck-engaging wall of substantial width, a cooperating ringlike stud split at one side to permit contraction and expansion as a whole for passage through the stud-receiving aperture to permit engagement of the neck with said neck-engaging wall, and attaching means integral with said stud for securing said stud to a support, whereby the desired contraction and expansion of said stud may be effected without interference from said attaching means.

3. A separable fastener stud comprising a one-piece ring like sheet metal socket-engaging body portion slit at one side to permit contraction and expansion thereof at all sides for engagement and disengagement with a suitable socket, and a plurality of integral attaching prongs at one edge of said body part for securing said body part to a suitable stud support, said prongs being yieldable with said body portion.

4. A separable fastener stud including a socket-engaging part slit at one side to permit contraction and expansion thereof, and a plurality of attaching prongs having portions thereof extending from said socket-engaging part through a flexible carrying medium into rigid engagement with an attaching plate to secure said socket-engaging part to the carrying medium, the remaining portions of said prongs adapted to flex with said socket-engaging part so as not to interfere with expansion and contraction thereof.

5. A fastener socket installation comprising, in combination, a stud-receiving part having a stud-receiving aperture surrounded by a generally curved portion, a socket-carrying medium and an attaching part presenting means securing said parts to opposite sides of the carrying medium, said means passing through the carrying medium and being upset and clenched by the curved portion of said stud-receiving part.

6. A fastener socket including a stud-receiving body part having a portion generally curved in cross-section, and an attaching part presenting a plurality of attaching prongs passing through a socket support and clinched by the curved portion of said body part to secure said parts to opposite sides of the support.

7. A fastener socket installation comprising, in combination, a body part having a flat flange portion, a ringlike portion depending from said flange portion and surrounding a stud-receiving aperture, an attaching part presenting a portion overlying the flange portion of said body part with a flexible carrying medium interposed therebetween, and a plurality of attaching prongs pressed from said attaching part, said prongs passing through the carrying medium and upset and clinched against said ringlike portion to secure the parts to opposite sides of the carrying medium.

8. A fastener stud installation comprising, in combination, a socket-engaging stud part contractible and expansible as a whole, a stud-carrying medium, an attaching part and attaching means presented by one of said parts, said attaching means securing said parts to the stud carrying medium, said attaching means being adapted to yield thereby permitting free expansion and contraction of the stud part.

In testimony whereof, I have signed my name to this specification.

FRED S. CARR.